United States Patent
Jacob et al.

(10) Patent No.: US 7,453,998 B2
(45) Date of Patent: Nov. 18, 2008

(54) METHODS AND SYSTEMS TO CONNECT CONSUMERS TO INFORMATION

(75) Inventors: Karl Jacob, San Francisco, CA (US); Scott Faber, San Francisco, CA (US); Sean Van der Linden, Berkeley, CA (US)

(73) Assignee: UTBK, Inc., Dover, DE (US)

( * ) Notice: Subject to any disclaimer, the term of this patent is extended or adjusted under 35 U.S.C. 154(b) by 0 days.

(21) Appl. No.: 11/691,372

(22) Filed: Mar. 26, 2007

(65) Prior Publication Data

US 2007/0280443 A1 Dec. 6, 2007

Related U.S. Application Data

(63) Continuation of application No. 10/956,771, filed on Oct. 1, 2004, now Pat. No. 7,224,781, which is a continuation of application No. 10/015,968, filed on Dec. 6, 2001, which is a continuation-in-part of application No. 09/702,217, filed on Oct. 30, 2000, now Pat. No. 6,636,590.

(51) Int. Cl.
 *H04M 15/00* (2006.01)
(52) U.S. Cl. ............................ 379/114.05; 379/114.13; 705/14; 705/26
(58) Field of Classification Search ................ 379/111, 379/114.01, 114.03, 114.05, 115.01, 120, 379/130, 201.01, 201.02, 201.05, 201.12, 379/114.13, 88.01, 88.02, 88.03, 88.04, 88.17; 705/14, 26
See application file for complete search history.

(56) References Cited

U.S. PATENT DOCUMENTS 4,313,035 A 1/1982 Jordan et al.

(Continued)

FOREIGN PATENT DOCUMENTS

AU 699785 5/1995

(Continued)

OTHER PUBLICATIONS

University of Texas—Austin, information on the Electronic Emissary Project retrieved at www.tapr.org/emissary, available at least by Apr. 9, 2000.

(Continued)

*Primary Examiner*—Binh K Tieu
(74) *Attorney, Agent, or Firm*—John P. Ward; Greenberg Traurig, LLP

(57) ABSTRACT

The present invention provides a method and apparatus for specifying and obtaining services through audio commands, resulting in a live conversation between a user and a selected service provider using an audio-transmission medium (the telephone). A service seeker locates a service provider by entering a keypad code corresponding to a field of service or by speaking the name of a profession, which is recognized by the system. The seeker can then specify, via voice or keypad entry, a price range, quality rating, language, and keyword descriptors of the service provider, such as a service provider code number. In response, the system offers currently available service providers. Once an available service provider is selected, the system connects the service seeker with the service provider for a live conversation. The system bills the seeker for the time spent conversing with the service provider and compensates the service provider accordingly.

38 Claims, 10 Drawing Sheets

U.S. PATENT DOCUMENTS

| | | | |
|---|---|---|---|
| 4,577,065 A | 3/1986 | Frey et al. |
| 4,631,428 A | 12/1986 | Grimes |
| 4,645,873 A | 2/1987 | Chomet |
| 4,677,434 A | 6/1987 | Fascenda |
| 4,723,283 A | 2/1988 | Nagasawa et al. |
| 4,751,669 A | 6/1988 | Sturgis et al. |
| 4,752,675 A | 6/1988 | Zetmeir |
| 4,847,890 A | 7/1989 | Solomon et al. |
| 4,850,007 A | 7/1989 | Marino et al. |
| 4,963,995 A | 10/1990 | Lang |
| 5,057,932 A | 10/1991 | Lang |
| 5,058,152 A | 10/1991 | Solomon et al. |
| 5,148,474 A | 9/1992 | Haralambopouos et al. |
| 5,155,743 A | 10/1992 | Jacobs |
| 5,164,839 A | 11/1992 | Lang |
| 5,262,875 A | 11/1993 | Mincer et al. |
| 5,319,542 A | 6/1994 | King et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,440,334 A | 8/1995 | Walters et al. |
| 5,448,625 A | 9/1995 | Lederman |
| 5,453,352 A | 9/1995 | Tachibana |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,148 A | 4/1997 | Guo |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,696,965 A | 12/1997 | Dedrick |
| 5,701,419 A | 12/1997 | McConnell |
| 5,710,887 A | 1/1998 | Chelliah et al. |
| 5,710,970 A | 1/1998 | Walters et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,724,521 A | 3/1998 | Dedrick |
| 5,734,961 A | 3/1998 | Castille |
| 5,740,231 A | 4/1998 | Cohn et al. |
| 5,745,681 A | 4/1998 | Levine et al. |
| 5,751,956 A | 5/1998 | Kirsch |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Patrecca et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,832,523 A | 11/1998 | Kanai et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| RE36,111 E | 2/1999 | Neville |
| 5,870,546 A | 2/1999 | Kirsch |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,416 A | 9/1999 | Block |
| 5,963,202 A | 10/1999 | Polish |
| 5,963,861 A | 10/1999 | Hanson |
| 5,974,141 A | 10/1999 | Saito |
| 5,974,398 A | 10/1999 | Hanson et al. |
| 5,978,567 A | 11/1999 | Rebane et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,995,705 A | 11/1999 | Lang |
| 5,999,609 A | 12/1999 | Nishimura |
| 5,999,611 A | 12/1999 | Tatchell et al. |
| 5,999,965 A | 12/1999 | Kelly |
| 6,006,197 A | 12/1999 | D'Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,375 A | 2/2000 | Hall et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardner et al. |
| 6,108,704 A | 8/2000 | Hutton et al. |
| 6,130,933 A | 10/2000 | Miloslavsky |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |

| | | |
|---|---|---|
| 6,189,030 B1 | 2/2001 | Kirsch et al. |
| 6,192,050 B1 | 2/2001 | Stovall |
| 6,199,096 B1 | 3/2001 | Mirashrafi et al. |
| 6,208,713 B1 | 3/2001 | Rahrer et al. |
| 6,212,192 B1 | 4/2001 | Mirashrafi et al. |
| 6,216,111 B1 | 4/2001 | Walker et al. |
| 6,223,165 B1 | 4/2001 | Lauffer |
| 6,230,287 B1 | 5/2001 | Pinard et al. |
| 6,243,684 B1 | 6/2001 | Stuart et al. |
| 6,259,774 B1 | 7/2001 | Miloslavsky |
| 6,269,336 B1 | 7/2001 | Ladd et al. |
| 6,269,361 B1 | 7/2001 | Davis et al. |
| 6,275,490 B1 | 8/2001 | Mattaway et al. |
| 6,292,799 B1 | 9/2001 | Peek et al. |
| 6,298,056 B1 | 10/2001 | Pendse |
| 6,301,342 B1 | 10/2001 | Ander et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,323,894 B1 | 11/2001 | Katz |
| 6,327,572 B1 | 12/2001 | Morton et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,408,278 B1 | 6/2002 | Carney et al. |
| 6,430,276 B1 | 8/2002 | Bouvier et al. |
| 6,434,527 B1 | 8/2002 | Horvitz |
| 6,463,136 B1 | 10/2002 | Malik |
| 6,466,966 B1 | 10/2002 | Kirsch et al. |
| 6,470,079 B1 | 10/2002 | Benson |
| 6,470,181 B1 | 10/2002 | Maxwell |
| 6,470,317 B1 | 10/2002 | Ladd et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,510,434 B1 * | 1/2003 | Anderson et al. ............ 707/100 |
| 6,523,010 B2 | 2/2003 | Lauffer |
| 6,529,878 B2 | 3/2003 | De Rafael et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,757,364 B2 | 6/2004 | Newkirk |
| 6,769,020 B2 | 7/2004 | Miyazaki et al. |
| 6,807,532 B1 | 10/2004 | Kolls |
| 5,825,876 A1 | 11/2004 | Easwar et al. |
| 6,813,346 B2 | 11/2004 | Gruchala et al. |
| 6,836,225 B2 | 12/2004 | Lee et al. |
| 6,847,992 B1 | 1/2005 | Haitsuka et al. |
| 6,850,965 B2 | 2/2005 | Allen |
| 6,859,833 B2 | 2/2005 | Kirsch et al. |
| 6,937,699 B1 | 8/2005 | Schuster et al. |
| 6,968,174 B1 | 11/2005 | Trandal et al. |
| 7,028,012 B2 | 4/2006 | St. Vrain |
| 7,035,381 B2 | 4/2006 | D'Ascenzo et al. |
| 7,076,037 B1 | 7/2006 | Gonen et al. |
| 7,092,901 B2 | 8/2006 | Davis et al. |
| 7,103,010 B2 | 9/2006 | Melideo |
| 7,200,413 B2 | 4/2007 | Montemer |
| 7,212,615 B2 | 5/2007 | Wolmuth |
| 7,224,781 B2 | 5/2007 | Jacob et al. |
| 7,231,405 B2 | 6/2007 | Xia |
| 2001/0010043 A1 | 7/2001 | Lauffer |
| 2001/0012913 A1 | 8/2001 | Iliff |
| 2001/0016826 A1 | 8/2001 | Lauffer |
| 2001/0018662 A1 | 8/2001 | Lauffer |
| 2001/0027481 A1 | 10/2001 | Whyel |
| 2001/0029322 A1 | 10/2001 | Iliff |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0048737 A1 | 12/2001 | Goldberg et al. |
| 2002/0003867 A1 * | 1/2002 | Rothschild et al. ....... 379/88.01 |
| 2002/0010608 A1 | 1/2002 | Faber et al. |
| 2002/0010616 A1 | 1/2002 | Itzhaki |
| 2002/0026457 A1 * | 2/2002 | Jensen ..................... 707/501.1 |
| 2002/0029241 A1 | 3/2002 | Yokono et al. |
| 2002/0038233 A1 | 3/2002 | Shubov et al. |
| 2002/0044640 A1 | 4/2002 | Meek et al. |
| 2002/0057776 A1 | 5/2002 | Dyer |
| 2002/0065959 A1 | 5/2002 | Kim et al. |
| 2002/0087565 A1 | 7/2002 | Hoekman et al. |
| 2002/0090203 A1 | 7/2002 | Mankovitz |
| 2002/0095331 A1 | 7/2002 | Osman et al. |
| 2002/0107697 A1 | 8/2002 | Jensen |
| 2002/0107805 A1 | 8/2002 | Kamimura et al. |
| 2002/0120554 A1 | 8/2002 | Vega |
| 2002/0122547 A1 | 9/2002 | Hinchey et al. |
| 2002/0133388 A1 | 9/2002 | Lauffer |
| 2002/0133402 A1 | 9/2002 | Faber et al. |
| 2002/0133571 A1 | 9/2002 | Jacob et al. |
| 2002/0136377 A1 | 9/2002 | Stewart et al. |
| 2002/0164977 A1 | 11/2002 | Link, II et al. |
| 2002/0173319 A1 | 11/2002 | Fostick |
| 2002/0191762 A1 | 12/2002 | Benson |
| 2002/0193094 A1 | 12/2002 | Lawless et al. |
| 2003/0026397 A1 | 2/2003 | McCroskey |
| 2003/0036686 A1 | 2/2003 | Iliff |
| 2003/0043981 A1 | 3/2003 | Lurie et al. |
| 2003/0046161 A1 | 3/2003 | Kamanger et al. |
| 2003/0046361 A1 | 3/2003 | Kirsch et al. |
| 2003/0050837 A1 | 3/2003 | Kim |
| 2003/0083042 A1 | 5/2003 | Abuhamdeh |
| 2003/0105824 A1 | 6/2003 | Brechner et al. |
| 2003/0135095 A1 | 7/2003 | Iliff |
| 2003/0138091 A1 | 7/2003 | Meek et al. |
| 2003/0153819 A1 | 8/2003 | Iliff |
| 2003/0163299 A1 | 8/2003 | Iliff |
| 2003/0195787 A1 | 10/2003 | Brunk et al. |
| 2003/0212600 A1 | 11/2003 | Hood et al. |
| 2003/0220866 A1 | 11/2003 | Pisaris-Henderson |
| 2003/0223563 A1 | 12/2003 | Wolmuth |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0008834 A1 | 1/2004 | Bookstaff |
| 2004/0010518 A1 | 1/2004 | Montemer |
| 2004/0023644 A1 | 2/2004 | Montemer |
| 2004/0076403 A1 | 4/2004 | Mankovitz |
| 2004/0083133 A1 | 4/2004 | Nicholas et al. |
| 2004/0091093 A1 | 5/2004 | Bookstaff |
| 2004/0096110 A1 | 5/2004 | Yogeshwar et al. |
| 2004/0162757 A1 | 8/2004 | Pisaris-Henderson |
| 2004/0174965 A1 | 9/2004 | Brahm et al. |
| 2004/0174974 A1 | 9/2004 | Meek et al. |
| 2004/0193488 A1 | 9/2004 | Khoo et al. |
| 2004/0204997 A1 | 10/2004 | Blaser et al. |
| 2004/0208185 A1 | 10/2004 | Goodman et al. |
| 2004/0234049 A1 | 11/2004 | Melideo |
| 2004/0234064 A1 | 11/2004 | Melideo |
| 2004/0235524 A1 | 11/2004 | Abuhamdeh |
| 2004/0236441 A1 | 11/2004 | Melideo |
| 2004/0247092 A1 | 12/2004 | Timmins et al. |
| 2004/0249649 A1 | 12/2004 | Stratton et al. |
| 2004/0249778 A1 | 12/2004 | Iliff |

| | | | | | |
|---|---|---|---|---|---|
| 2004/0254859 A1 | 12/2004 | Aslanian | 2007/0255622 A1 | 11/2007 | Swix et al. |
| 2004/0260413 A1 | 12/2004 | Melideo | | | |
| 2005/0010795 A1 | 1/2005 | Tagawa et al. | FOREIGN PATENT DOCUMENTS | | |
| 2005/0018829 A1 | 1/2005 | Baker | | | |
| 2005/0021744 A1 | 1/2005 | Haitsuka et al. | GB | 2329046 | 3/1999 |
| 2005/0038686 A1 | 2/2005 | Lauffer | JP | 409233441 | 9/1997 |
| 2005/0041647 A1 | 2/2005 | Stinnie | JP | 409319812 | 12/1997 |
| 2005/0044238 A1 | 2/2005 | Jacob et al. | WO | 9705733 | 2/1997 |
| 2005/0048961 A1 | 3/2005 | Ribaudo et al. | WO | 9802835 | 1/1998 |
| 2005/0063811 A1 | 3/2005 | Chu et al. | WO | 9804061 | 1/1998 |
| 2005/0074100 A1 | 4/2005 | Lederman | WO | 9813765 | 4/1998 |
| 2005/0074102 A1 | 4/2005 | Altberg et al. | WO | 9838558 | 9/1998 |
| 2005/0076100 A1 | 4/2005 | Armstrong | WO | 9847295 | 10/1998 |
| 2005/0080878 A1 | 4/2005 | Cunningham et al. | WO | 9955066 | 10/1999 |
| 2005/0086104 A1 | 4/2005 | McFadden | WO | 0244870 | 6/2002 |
| 2005/0100153 A1 | 5/2005 | Pines et al. | WO | 2005040962 | 5/2005 |
| 2005/0105881 A1 | 5/2005 | Mankovitz | WO | 2005088980 | 9/2005 |
| 2005/0114210 A1 | 5/2005 | Faber et al. | WO | 2005101269 | 10/2005 |
| 2005/0125416 A1 | 6/2005 | Kirsch et al. | WO | 2005109287 | 11/2005 |
| 2005/0135387 A1 | 6/2005 | Rychener et al. | WO | 2005109288 | 11/2005 |
| 2005/0154616 A1 | 7/2005 | Iliff | WO | 2005111887 | 11/2005 |
| 2005/0165285 A1 | 7/2005 | Iliff | WO | 2005111893 | 11/2005 |
| 2005/0165666 A1 | 7/2005 | Wong et al. | WO | 2006091966 | 8/2006 |
| 2005/0203799 A1 | 9/2005 | Faber et al. | WO | 2006091970 | 8/2006 |
| 2005/0207432 A1 | 9/2005 | Velez-Rivera et al. | WO | 07028173 | 3/2007 |
| 2005/0209874 A1 | 9/2005 | Rossini | WO | 07038618 | 4/2007 |
| 2005/0216341 A1 | 9/2005 | Agarwal et al. | | | |
| 2005/0216345 A1 | 9/2005 | Altberg et al. | | | |
| 2005/0220289 A1 | 10/2005 | Reding | | | |
| 2005/0222908 A1 | 10/2005 | Altberg et al. | | | |
| 2005/0240432 A1 | 10/2005 | Jensen | | | |
| 2005/0245241 A1 | 11/2005 | Durand et al. | | | |
| 2005/0251445 A1 | 11/2005 | Wong et al. | | | |
| 2005/0261964 A1 | 11/2005 | Fang | | | |
| 2005/0286688 A1 | 12/2005 | Scherer | | | |
| 2005/0289015 A1 | 12/2005 | Hunter et al. | | | |
| 2006/0003735 A1 | 1/2006 | Trandal et al. | | | |
| 2006/0004627 A1 | 1/2006 | Baluja | | | |
| 2006/0095343 A1 | 5/2006 | Clarke et al. | | | |
| 2006/0099936 A1 | 5/2006 | Link et al. | | | |
| 2006/0106711 A1 | 5/2006 | Melideo | | | |
| 2006/0159063 A1 | 7/2006 | Kumer | | | |
| 2006/0166655 A1 | 7/2006 | Montemer | | | |
| 2006/0171520 A1 | 8/2006 | Kliger | | | |
| 2006/0173827 A1 | 8/2006 | Kliger | | | |
| 2006/0173915 A1 | 8/2006 | Kliger | | | |
| 2006/0182250 A1 | 8/2006 | Melideo | | | |
| 2006/0184417 A1 | 8/2006 | Van der Linden et al. | | | |
| 2006/0200380 A1 | 9/2006 | Ho et al. | | | |
| 2006/0259365 A1 | 11/2006 | Agarwal et al. | | | |
| 2006/0277108 A1 | 12/2006 | Altberg et al. | | | |
| 2006/0277181 A1 | 12/2006 | Temple et al. | | | |
| 2007/0011240 A1 | 1/2007 | Altberg et al. | | | |
| 2007/0022011 A1 | 1/2007 | Altberg et al. | | | |
| 2007/0038507 A1 | 2/2007 | Kumer | | | |
| 2007/0067219 A1 | 3/2007 | Altberg et al. | | | |
| 2007/0078717 A1 | 4/2007 | Ho et al. | | | |
| 2007/0081662 A1 | 4/2007 | Altberg et al. | | | |
| 2007/0083408 A1 | 4/2007 | Altberg et al. | | | |
| 2007/0100956 A1 | 5/2007 | Kumer | | | |
| 2007/0116217 A1 | 5/2007 | Altberg et al. | | | |
| 2007/0121844 A1 | 5/2007 | Altberg et al. | | | |
| 2007/0121845 A1 | 5/2007 | Altberg et al. | | | |
| 2007/0121846 A1 | 5/2007 | Altberg et al. | | | |
| 2007/0121847 A1 | 5/2007 | Faber et al. | | | |
| 2007/0121848 A1 | 5/2007 | Faber et al. | | | |
| 2007/0124206 A1 | 5/2007 | Faber et al. | | | |
| 2007/0124207 A1 | 5/2007 | Faber et al. | | | |
| 2007/0127650 A1 | 6/2007 | Altberg et al. | | | |
| 2007/0129054 A1 | 6/2007 | Andronikov et al. | | | |
| 2007/0130014 A1 | 6/2007 | Altberg et al. | | | |
| 2007/0140451 A1 | 6/2007 | Altberg et al. | | | |
| 2007/0143182 A1 | 6/2007 | Faber et al. | | | |

OTHER PUBLICATIONS

Wagner, Mary, "Caring for Customers: Real-Time Text Chat and Telephony Provide Personalized Customer Support and Turn Queries into Sales Leads," Internet World Media, vol. 5, iss. 28, p. 30, Sep. 1, 1999.

Wasik, Joann M., "Information for Sale: Commercial Digital Reference and AskA Services," Virtual Reference Desk, http://www.vrd.org/AskA/commAskA.html, Sep. 20, 1999.

Wieland, Heidi et al., "Expertcity.com Launches Premier Online Marketplace for Expert Services," PR Newswire, Aug. 30, 1999.

Keen.com, company information retrieved from http://www.keen.com, available at least by 1999.

ISA/US, International Search Report for International Application No. PCT/US05/12061, 3 pages, Nov. 17, 2006.

Chimiak, William H. et al., "Multimedia Collaborative Remote Consultation Tools via Gigabit WAN in Teleradiology," IEEE 13th Annual International Phoenix Conference on Computers and Communications, pp. 417-423, Apr. 12-15, 1994.

Griffiths, J.W.R. et al., "Multimedia Communication in a Medical Environment," Singapore International Conference on Networks, pp. 166-171, Sep. 5, 1991.

ISA/US, International Search Report for International Application No. PCT/US01/48284, 7 pages, May 13, 2002.

Sairamesh, Jakka et al., "NetBazaar: Networked Electronic Markets for Trading Computation and Information Services,"Second European Conference on Research and Advanced Technology for Digital Libraries, pp. 839-856, Sep. 21, 1998.

Wood, Christina, "Hidden Cost of Tech Support," PC World, pp. 143-152, 156, May 1995.

"Keen.com raises $60 Million from Prestigious Investors and Strategic Partners Just 60 Days After Launch of Its Live Answer Community," Business Wire, Jan. 11, 2000.

"Sell and Buy Advice Online," The Ottawa Citizen, p. D7, Nov. 29, 1999.

Ingenio, Inc., "Keen: Your Personal Advisor," retrieved from http://www.keen.com, available at least by Feb. 4, 2006.

Reding, Craig et al., U.S. Appl. No. 09/596,466 entitled "Methods and Apparatus for Providing Telephone Support for Internet Sales," filed Jun. 19, 2000.

Melideo, John, U.S. Appl. No. 60/471,535 entitled "HyperDial," filed May 19, 2003.

Bazini, Liz, "UpSnap Selects LookSmart to Sell Premium Listing on Free 411 Service for Text-Enabled Cell Phones," Nov. 4, 2004.

Green Digital Media, Inc., Big Green Blog: Jan. 2005 Archives, Jan. 28-31, 2005.

Greenberg, Ken, "Jambo Launches to Connect People and Businesses from the Internet to the Phone," Market Wire, May 3, 2005.

Greenberg, Ken, "Jambo Names Netzero Co-founder Stacy Haitsuka to New Post of Chief Information Officer," Business Wire, Jul. 5, 2005.

Greenberg, Ken, "Jambo Receives $5 Million in Financing from Kline Hawkes & Co., Westlake Venture Partners, Others," Business Wire, Oct. 17, 2005.

Ingenio, Inc., Press Archives for 2004, retrieved from http://www.ingenio.com on Feb. 21, 2006.

Jambo, "Welcome to Jambo—The Leader in Pay-Per-Call Solutions," company information retrieved from http://www.jambo.com, available at least by Oct. 17, 2005.

Jingle Networks, Inc., "Introducing 1-800 Free411 First Nationwide Free Telephone Directory Assistance Service," Sep. 20, 2005.

Clark, Don, "Keen.com Plans Web Service Allowing Customers to Hold Private Phone Chats," Wall Street Jounral, Nov. 8, 1999.

ADS-Click, "ADS-click Adds Skype-Based Pay-Per-Call Advertising Capabilities to Its Private-Labeled Solution, which will be Unveiled at ad:tech New York," Market Wire, Oct. 10, 2005.

Jingle Networks, Inc., "1-800-Free411 Provides Two Great Opportunities to Acquire New Customers," available at least by Oct. 20, 2005.

"Applying Technology News," Accounting Technology, p. 14, Feb./Mar. 1997.

"Connecting to On-Line Car Shoppers: Auto Sellers Use Netcall Internet Call-Button Technology to Turn 'Clicks' into Interactive Sales," Business Wire, p. 4089, Jul. 19, 1999.

"NetCall Internet Call Buttons Enhance E-Commerce Customer Service and Sales," PR Newswire, p. 7431, Aug. 9, 1999.

"TriNet's 'Help Me, I'm Stuck' Internet Voice Button Services Pushes Web Pages to Online Users," Business Wire, Mar. 25, 1998.

Addeo, E.J. et al., "An Experimental Multi-Media Bridging System," Frontiers in Computer Communications Technology, Computer Communications Review, vol. 17, No. 5, pp. 236-242, Aug. 11-13, 1987.

Allexperts.com, company information retrieved from http://www.allexperts.com, available at least by Apr. 9, 2000.

Angelo, Simon, "SurfBrains.com: Brains Online Save Time & Money," M2 Presswire, Jul. 11, 2000.

Aanswer.com, company information retrieved from http://www.answers.com, available at least by Aug. 8, 2000.

Asthana, Abhaya et al., "A Small Domain Communications System for Personalized Shopping Assistance," IEEE International Conference on Personal Wireless Communications, Publication No. 0-7803-1996-6/94, pp. 199-203, Aug. 18, 1994.

Becker, Ralph, "ISDN Tutorial: Interfaces," retrieved from http://www.ralphb.net/ISDN/ifaces.html, available at least by Apr. 21, 2000.

Becker, Ralph, "ISDN Tutorial: Definitions," retrieved from http://www.ralphb.net/ISDN/defs.html, available at least by Apr. 21, 2000.

Broad, Doug et al., "Lucent Technology and Netscape Team to Deliver Lucent Ecommerce Solutions," Business Wire, Sep. 23, 1998.

Collett, Stacey et al., "Why Online Browsers Don't Become Buyers," Computerworld, vol. 33, No. 48, p. 14, Nov. 29, 1999.

Dalton, Gregory, "Rent-An-Expert on the Web," Information Week, p. 75, Sep. 6, 1999.

Davey, Tom, "Wheeling and Dealing Online," PC Week, vol. 13, No. 45, pp. 1, 129, Nov. 11, 1996.

De Lasser, Eleena, "When Business Plan and Real World Clash," Wall Street Journal, p. B1, Jun. 1999.

Drescher, Bob et al., "Aspect Telecommunications Integrates the Web into the Call Center to Deliver New Level of Customer Service," Business Wire, Aug. 5, 1996.

Dyson, Esther, "Information, Bid and Asked," Forbes, p. 92, Aug. 20, 1990.

Ek, Brian, "Walker Digital Issued Landmark U.S. Patent No. 5,862,223 for Global Internet Marketplace for Experts", Business Wire, Jan. 26, 1999.

Ellis, James E., "For Telesphere's Clients, Dial 1-900 Tuf Luck," Business Week, pp. 88-89, Sep. 9, 1991.

Exp.com, Inc., company information retrieved from http://www.exp.com, available at least by Sep. 20, 2000.

Expertcity.com, "About Us," company information retrieved from http://www.expertcity.com, available at least by Apr. 9, 2000.

Experts Exchange, Inc., company information retrieved from http://www.experts-exchange.com, available at least by Apr. 9, 2000.

Greenblatt, Ellen, "Have you ever wondered . . . ," Datamation, p. 126, Oct. 1997.

Hase, Masahiko et al., "Advanced Videophone System Using Synchronized Video Filing Equipment," NTT Review, vol. 3, No. 4, pp. 29-36, Jul. 1991.

Healey, John, "From A-Z: You Can Sell Advice Online," San Jose Mercury News, retrieved from http://www.mercurycenter.com on Oct. 24, 2001.

Herman, Edith, "U.S. Courts to Launch First Federal 900 Service," Federal Computer Week, pp. 8, 10, Sep. 28, 1992.

Herzberg, Amir et al., "MiniPay: Charging Per Click on the Web,"Computer Networks and ISDN Systems, vol. 29, pp. 939-951, Sep. 1997.

Hodgson, Cynthia, "Online Expert Databases & Services," Econtent, pp. 48-53, Dec. 1999.

Information Markets Corp., company information retrieved from http://www.infomarkets.com, available at least by Aug. 8, 2000.

Intellectexchange.com, Inc., company information retrieved from http://www.intellectexchange.com, available at least by Aug. 8, 2000.

Jarvie, Barbara, "Company Devoted to Hot-Line Support," Computer Reseller News, p. 48, Oct. 21, 1991.

Kabeya, Kiyoshi et al., "A New Teleconsultation Terminal System Using ISDN," NTT Review, vol. 3, No. 4, pp. 37-43, Jul. 1991.

Kanellos, Michael, "Web Watch: Do You Want To Know The Meaning of Life?," Computer Reseller News, pp. 72-74, Mar. 3, 1997.

KEEN.COM, "Keen.Com Launches First Live Answer Community, Connects People with Information to Share Over Their Standard Telephone," company press release, Nov. 8, 1999.

Kuehn, Richard A., "The Voice of Technology," Credit World, pp. 20-23, Jul. 1994.

Littleton, Linda, "HDD: A Helpdesk Database," Proceedings of the ACM SIGUCCS User Services Conference XXII, pp. 205-210, Oct. 16-19, 1994.

Ludwig, L.F. et al., "Laboratory for Emulation and Study of Integrated and Coordinated Media Communication," Conference on Office Information Systems, pp. 283-291, Mar. 23-25, 1988.

Menn, Joseph, "An Expert? There's Now a Home for You on the Internet," Los Angeles Times, retrieved from http://www.denverpost.com on Oct. 24, 2001.

Mercalli, Franco et al., "The ESSAI Teleshopping System: An Example of a Broadband Multimedia Application," IEEE Global Telecommunications Conference, pp. 572-576, Nov. 28, 1994.

Moore, Michael et al., "USA Global Link Brings Interactively to Internet Shopping," Business Wire, Oct. 7, 1998.

Ott, Chris, "Making Good on the Information Economy," Denver Business Journal, vol. 51, No. 17, p. 27A, Dec. 17, 1999.

Pelline, Jeff, "Net Firm to Connect Users by Phone," CNET News.com, Nov. 8, 1999.

Qcircuit.com, company information retrieved from http://www.qcircuit.com, available at least by Aug. 8, 2000.

Robinson, John, "Attachmate Ready to Answer 'Net Questions," Network World, p. 37, Apr. 8, 1996.

Rogers, Michael et al, "Experts Abound at New Web Sites," Library Journal, pp. 22-24, Mar. 1, 2000.

Tehrani, Rich, "e-Rip Van Winkle and the 60-second Nap," Call Center Solutions, vol. 18, No. 2, pp. 16-18, Aug. 1999.

Telecommunications Buyers Guide and Directory, Editor & Publisher, pp. 29TC-38TC, Feb. 12, 1994.

U.S. District Court, Southern District of New York, Keen.com, Inc. v. InfoRocket.com, Inc., Preliminary Injunction Hearing, pp. 286-289, Jan. 8, 2002.

U.S. District Court, Southern District of New York, Keen.com, Inc. v. InfoRocket.com, Inc.: Complaint for Patent Infringement, Trade Dress Infringement and Unfair Competition; Demand for Jury Trial, Aug. 31, 2001.

"AtOnce Talks Up E-mail Marketing Campaigns with ITXC Push to Talk Service," Business Wire, Feb. 26, 2001.

"ITXC Corp and Doubleclick Energize Banner Ads with Web Telephony; Companies Voice-Enable Banner Advertisements Using ITXC Push to Talk Service," Business Wire, Dec. 12, 2000.

Ingenio, Inc., "FindWhat.com Enters Agreement with Ingenio to Offer Pay Per Call Advertising Platform," press release available at http://www.ingenio.com, Apr. 7, 2004.

ISA/US, International Search Report for International Application No. PCT/US01/48284, 7 pages, May 13, 2002.

Jambo, "Welcome to Jambo—The Leader in Pay-Per-Call Solutions," company information retrieved from http://www.jambo.com, available at least by Oct. 17, 2005.

Sterling, Greg, "Ingenio's Ether—Pay Per Professional Advice," Search Engine Journal, Mar. 3, 2006.

* cited by examiner

550

KEEN™.com
Your Live Answer Community ™

You cannot change your Availability on this page    Notify me of incoming calls    [• | Sign Out]

| Home | My Account | Keen Mall | My Listings | Help |

View My Listings | Create a Listing | My Homepage | My Customers | Speaker Tips

All Categories > Computing & Internet > Microsoft Office > Microsoft Excel

Create Your Live Answer Listing

Title: [Help with Microsoft Excel]
Choose a title that briefly explains what knowledge you are offering.
50 character maximum, no HTML. SEE TIPS

Description: This is your chance to introduce yourself to the Keen.com community, so be thorough and creative (7000 characters maximum (HTML OK)) SEE TIPS > My name is Danielle. I am a graduate student in Economics at the University of Chicago. I can offer help with using Microsoft Excel, especially tackling problems relating to regression analysis, statistical theory, forecasting, and writing macros.

Price Per Minute: [$1.00]
Our suggested per minute fee. You can choose a higher or lower fee, as long as it is at least equal to the basic long distance connection charge-5 cents a minute for the U.S. and Canada.

Your Languages
You can enter as many languages as you'd like. Remember, Keen.com members can call you from all around the world - let our community know what languages you speak!

| ☐ Arabic | ☐ Dutch | ☐ French | ☐ Italian | ☐ Mandarin | ☐ Spanish |
| ☐ Cantonese | ☑ English | ☐ German | ☐ Japanese | ☐ Norwegian | ☐ Swedish |
| ☐ Danish | ☐ Finnish | ☐ Hebrew | ☐ Korean | ☐ Portuguese | |

Other Languages: [(none) ▼]

[ OK ] [ Cancel ]

FIG. 4

METHODS AND SYSTEMS TO CONNECT CONSUMERS TO INFORMATION

CROSS-REFERENCE TO RELATED APPLICATIONS

The present patent application is a continuation application of U.S. patent application Ser. No. 10/956,771 filed Oct. 1, 2004, which is a continuation application of U.S. patent application Ser. No. 10/015,968 filed Dec. 6, 2001, which is a continuation-in-part application of U.S. patent application Ser. No. 09/702,217 filed Oct. 30, 2000, which is now U.S. Pat. No. 6,636,590, issued Oct. 21, 2003. All of the above-referenced applications are incorporated herein by reference.

FIELD OF THE INVENTION

The invention relates generally to providing users with service providers in a field of service desired by the user. In particular, the invention relates to a method and apparatus for specifying and obtaining services, via an audio portal, resulting in a live conversation between a user and a selected service provider.

BACKGROUND OF THE INVENTION

Consumers interested in acquiring services must first identify a service provider who is capable of providing the required services. At present, this usually means perusing a telephone directory, which can become frustrating and time-consuming if the service providers telephoned are not immediately available. In addition, a simple telephone call does not enable the service provider to charge a fee according to the time spent with his/her customers.

Systems now exist that enable providers of services to charge fees for the time spent delivering the service. 1-900 phone numbers will charge the seeker of services according to the time spent receiving the service and will transfer this payment, or a portion of it, to the provider.

Each 1-900 number, however, has a very narrow scope-"Hear your Horoscope," for instance. If a seeker would like to hear an entirely different service-"Your Local Weather," for instance-he/she would have to dial a completely different 1-900 number. Similarly, each 1-900 number is quite rigid in the price, quality, and specificity of its service.

However, current systems now exist that enable seekers to locate service providers according to a wide range of price, quality and specificity of service (U.S. application Ser. No. 09/414,710). Such systems also make it possible for the service provider and buyer to be connected and communicate in real time.

Such systems, however, require the service seeker to have a connection to the internet. The service seeker must also have the necessary computer hardware to browse the internet. Presently, there is no system available by which a service seeker can be matched to a wide array of service providers with specific skills using only a simple audio-transmission medium such as the telephone.

Therefore, there remains a need to overcome limitations in the above described existing art which is satisfied by the inventive structure and method described hereinafter.

SUMMARY OF THE INVENTION

The present invention overcomes the problems in the existing art described above by providing a method and apparatus for specifying and obtaining services, via an audio portal, resulting in a live conversation between a user (service seeker) and a selected service provider. The present invention is a system through which seekers of a wide array of services can select, contact, converse, and pay for a service provider using a simple audio-transmission medium such as the telephone. The invention enables the seeker to locate a service provider by speaking the name of a profession, such as "psychiatrist," which is recognized by the system's voice-recognition software. Alternatively, the user can select a service provider category by pressing corresponding keypad(s) of a user telephone.

In a similar fashion, the seeker can then specify the price range, quality rating, language, and keyword descriptors of the service provider using either voice commands or keypad entry. Within the desired parameters, the system offers service providers who have made themselves available to render services at the present time. Once the appropriate available service provider is selected, the system connects the service seeker with the service provider for a live conversation. The system automatically bills the seeker for the time spent conversing with the service provider and compensates the service provider accordingly.

Advantages of the invention include providing users with the capability to engage in a live conversation with a selected service provider via a telephone. Contrary to prior systems, requiring an internet connection and browser to receive such services, the equivalent is now provided by a simple audio transmission medium such as the telephone. As a result, virtually anyone can benefit from the capabilities provided by the present invention. The system also allows providers of a field of service to be compensated for supplying their expertise to a user.

BRIEF DESCRIPTION OF THE DRAWINGS

The present invention is illustrated by way of example, and not by way of limitation, in the figures of the accompanying drawings and in which:

FIG. 4 depicts a web page presented to a service provider desiring inclusion in a service provider database of the present invention;

DETAILED DESCRIPTION

Figure 1:
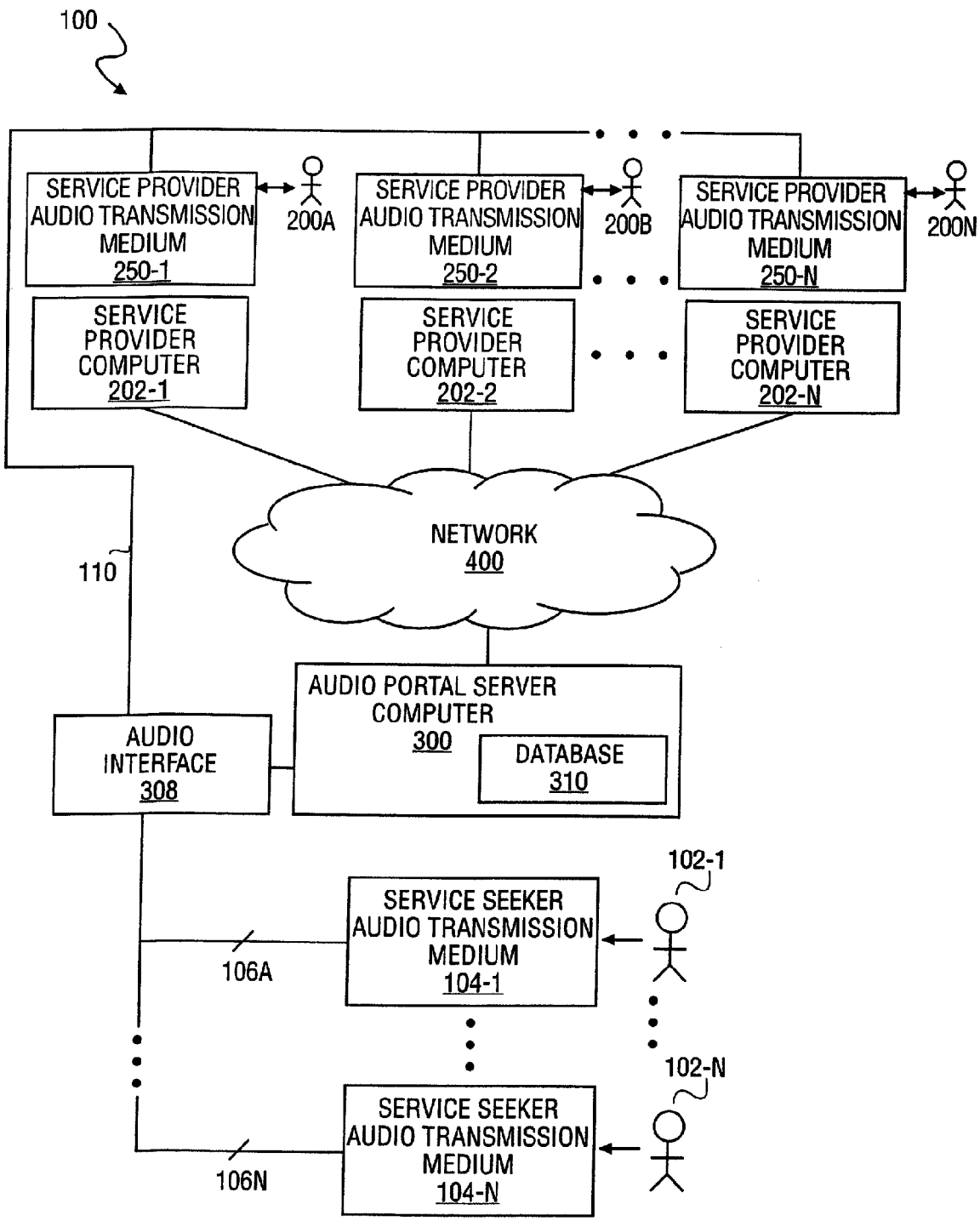
FIG. 1 depicts a block diagram illustrating a system in which an audio portal service provider system in accordance with the present invention may be implemented.

The present invention overcomes the problems in the existing art described above by providing a method and apparatus for specifying and obtaining services through voice commands resulting in a live conversation between a user (service seeker) and a selected service provider. The invention enables the seeker to locate a service provider by speaking the name of a profession, such as "psychiatrist," which is recognized by the system's voice-recognition software. Alternatively, the seeker can select a service provider category by pressing corresponding telephone keypad(s). Once the appropriate available service provider is selected, the system connects the service seeker with the service provider for a live conversation. The system automatically bills the seeker for the time spent conversing with the service provider and compensates the service provider accordingly.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciate that discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting $A+B=C$ as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

FIG. 1 depicts one embodiment of an audio portal service provider system architecture 100 in which the systems and methods of the present invention may be incorporated. One or more service provider computers 200 (200-1, 200-2, . . ., 200N) are connected through a network 400 (such as an Intranet, a LAN or a WAN such as the Internet) to a host computer or web server ("audio portal server computer") 300. Persons skilled in the art will recognize that the audio portal server computer 300 may include one or more computers working together to provide the controller computer functions described herein. The audio portal system 100 includes one or more service providers 200 (200-1, . . . , 200-N) each having an audio transmission medium 250 (250-1, . . . 250-N) that is connected to a communications network 110.

Accordingly, one or more users (service seekers) 102 (102-1, . . ., 102-N) access the audio portal system 100 via audio transmission mediums 104 (104-1, . . . 104-N) that are connected to the communications network 110. In accordance with the teachings of the present invention, a service seeker 102 (102-1, . . ., 102-N) can send a request 106 (106-1, . . ., 106-N) via the audio transmission medium 104, which is received by the audio portal server computer 300 via an audio interface 308. The request may be in the form of either a voice command or keypad entry via an audio transmission medium 104. As described in further detail below, the audio portal server computer 300 can then connect the service seeker 102 to a selected service provider 200 for a live conversation via the audio interface 308.

The communications network 110 generally refers to any type of wire or wireless link enabling the transmission of voice or keypad data such as, but not limited to, a public switched telephone network, a wireless communications network, a local area network, a wide area network or a combination of networks. The audio transmission mediums 104 and 250 generally refer to any type of device capable of receiving speech or keypad entry from a user and providing the speech/keypad entry to a destination via a communications network, such as the communications network 110. In an embodiment of the present invention, the communications network 110 is a public switched telephone network and the audio transmission medium is a telephone.

Figure 2A:
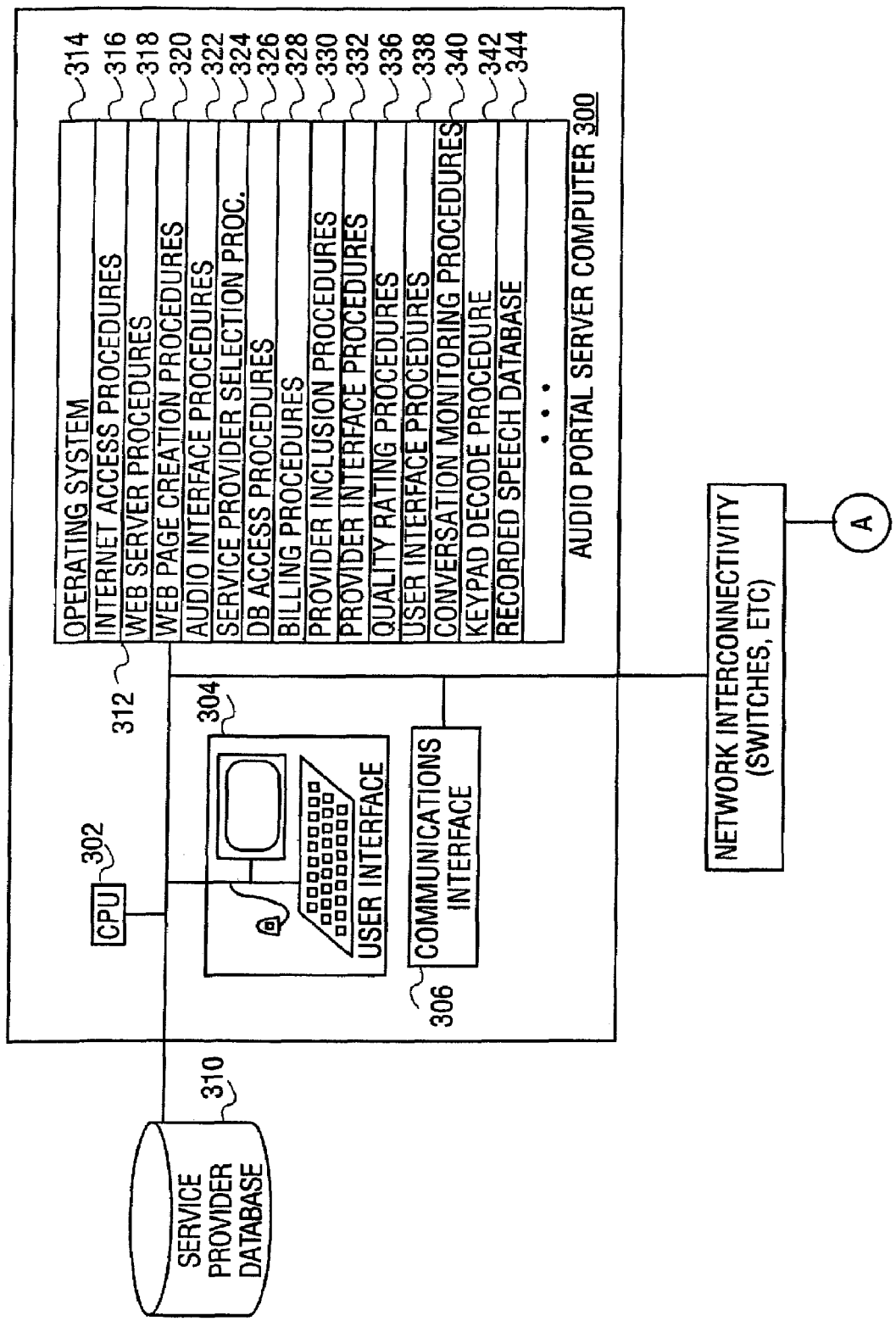
FIGS. 2A and 2B depict block diagrams further illustrating the audio portal service provider system as shown in FIG. 1.

FIG. 2A further illustrates the audio portal service provider system 100, including the audio portal server computer 300, as well as the service provider computer 202. The audio portal server computer 300 includes a central processing unit (CPU) 302, a user interface 304, a communications interface 306, an audio interface 308, a service provider database 310 and a memory 312. The audio portal server computer 300 can be any type of computing device, such as, but not limited to, desktop computers, work stations, lap tops and/or mainframe computers.

The audio interface 308 is used to communicate with users 102 and service providers 200, as well as other system resources not shown. The audio interface 308 receives an audio request 106 provided by user 102 through an audio transmission medium 104, which is provided over the communications network 110. The audio interface 308 provides digitized voice requests to the audio portal server computer 300 for interactive voice recognition, including voice processing, speech recognition and text-to-speech processing. The memory 312 of the audio portal server computer 300 may be implemented as RAM (random access memory), SRAM (synchronous RAM), SDRAM (synchronous data RAM) or a combination of RAM and non-volatile memory, such as one or more memory modules, storage volumes, or magnetic disk storage units. The memory can contain any of the following:

an operating system 314;
internet access procedures 316;
web server procedures 318;
web creation procedures 320;
audio interface procedures 322 for receiving an audio request (voice/keypad entry) 106 from the user 102 via the audio interface 308 and utilizing either integrated voice recognition (IVR) for voice requests or dual tone multi-frequency (DTMF) decoding for keypad entry request to provide the user with a selected service provider and connect the service seeker 102 with the selected service provider 200 for a live conversation;
service provider selection procedures 324 for providing the service seeker 102 with an auditory list of fields of service providers provided by the audio portal system 100, as well as auditory lists of service providers matching a field of service selected by the user 102;
database (DB) access procedures 326 for querying the database 310 in order to return records of service providers matching a field of service selected by the user 102;
billing procedures 328 for billing the service seeker 102 following a live conversation with the service provider 200, as well as compensating the service provider 200 for the live conversation and collecting a premium fee for the audio portal system 100;
provider inclusion procedures 330 for providing an on-line interface, as well as an audio interface (e.g., via telephone), to service providers 200 requesting inclusion in the service provider database 310 in order to provide live services via the audio portal system 100 to perspective users 102;
provider interface procedures 332 for providing both an online interface, as well as an audio interface, allowing service providers 200 to update information in the service provider database 310, including times of availability;
quality rating procedures 336 for receiving a quality rating for a service provider 200 following a live conversation with a user 102 based on the user's evaluation of the services provided by the service provider 200;
user interface procedures 338 for providing the service seeker 102 with an audio listing of fields of service available from the audio portal system 100, a keypad value corresponding to each field of service for non-integrated voice recognition embodiments, as well as receiving various descriptors for narrowing the search of service providers, including acceptable price ranges, acceptable quality ratings, specific languages, as well as a service provider ID of a specific service provider when known by the service seeker 102;
conversation monitoring procedures 340 for measuring the duration of the live conversation between the service seeker 102 and the service provider 200;
keypad decoding procedures 342 for decoding service seeker 102 responses entered via keypads of an audio transmission medium 104 (DTMF signals) and converting the requests into a query for selecting either service provider categories or specific service providers from service provider database 310 and providing the selected categories and service providers to the user via user interface procedures 338;
recorded speech database 344 which contains voice listings of the various fields of service available from the service provider system, as well as names of each service provider corresponding to each field of service available from the audio portal system 100, which are provided to the user in order to enable the user to select a service provider to engage in a live, real-time conversation therewith; and other procedures and files.

Figure 2B:
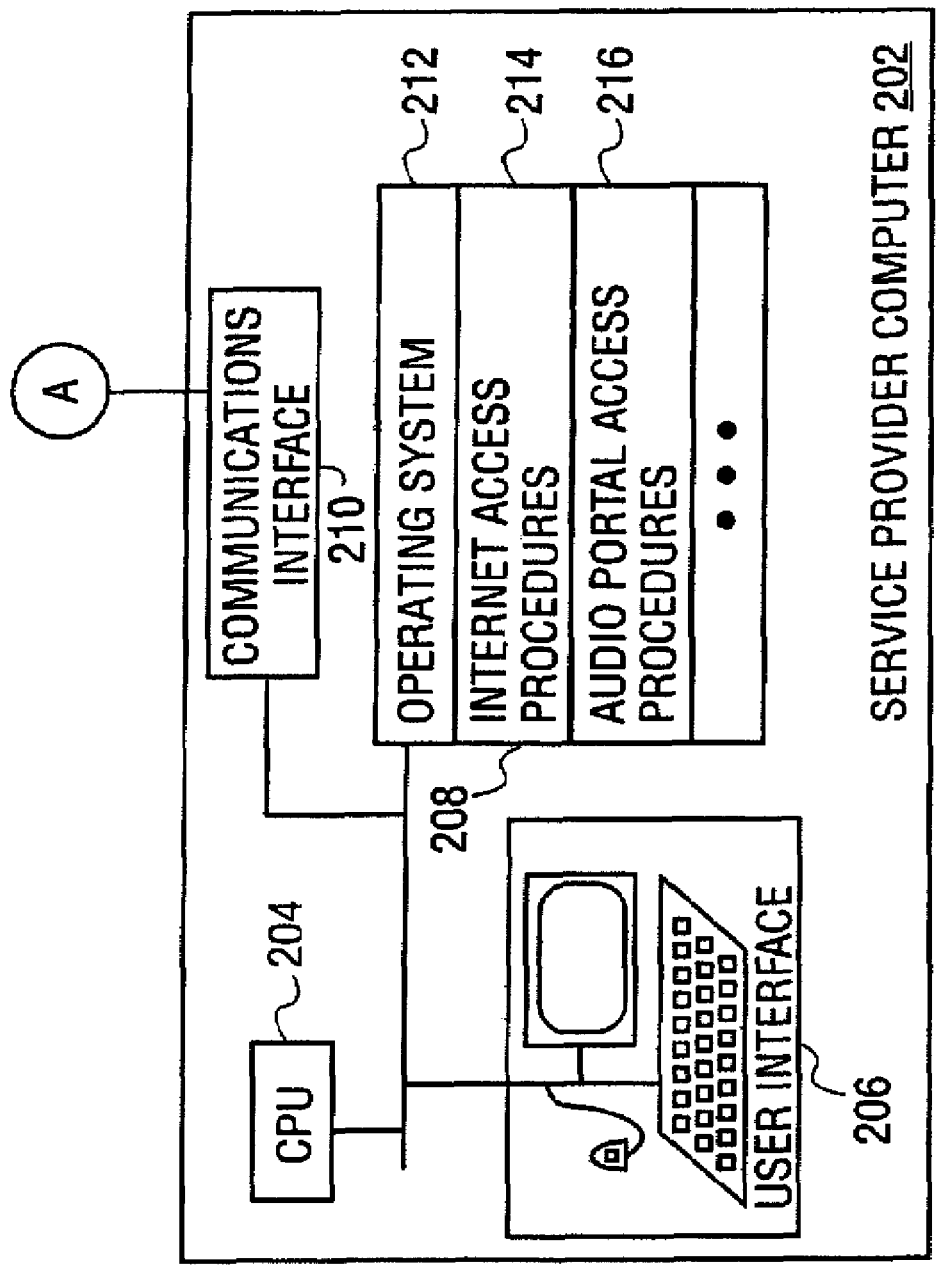

Referring now to FIG. 2B, FIG. 2B illustrates the service provider computer 202, which includes a CPU 204, a user interface 206, a memory 210 and a communications interface 208. The communications interface 208 is used to communicate with the audio portal server computer 300, as well as other system resources not shown. The memory 208 of the service provider computer 202 may be implemented as RAM (random access memory) or a combination of RAM and non-volatile memory, such as one or more magnetic disk storage units. The memory 208 can contain the following:

an operating system 212;
internet access procedures 214;
audio portal access procedures 216 for accessing the audio portal server computer 300; and
other procedures and files.

Figure 3:
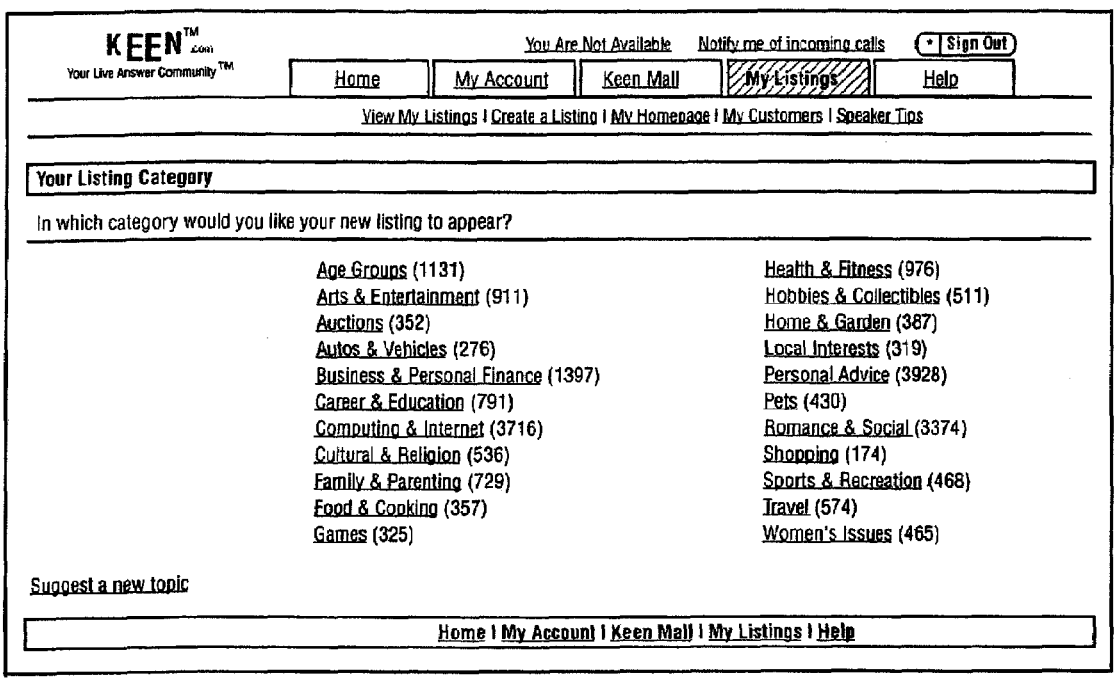
FIG. 3 depicts a web page, including a list of fields of service from which service providers can be selected for live conversations in accordance with a further embodiment of the present invention.

The embodiments depicted in FIGS. 2A and 2B include a service provider database 310 containing information about a wide array of service providers 200. In order to present themselves to their potential clients (service seekers), service providers 200 list themselves in this database 310. In one embodiment, this is done through the use of an Internet web site, via web pages 510 and 550, as depicted in FIGS. 3 and 4. The service provider 200 registers his/her name and phone number using the web page 550, along with a description of the service that he/she offers. Possible examples of the wide array of fields of service available from the audio portal system 100 include, but are not limited to, the fields of service depicted in FIG. 3. The description includes key words describing the field of service. The description also includes a price for rendering the service, most commonly, but not restricted to a per-minute price.

The service provider 200 then informs the audio portal system 100 of the times when he/she is available to receive calls. This can be done by creating a schedule of suitable times at the web site 500 or by simply clicking on an "on call" "off call" switch at the web site 500. Switching service provider 200 availability status can also be done through an audio transmission medium such as a telephone. The service provider 200 calls the central phone number, identifies himself/ herself with a password, then presses the telephone keypad "1" or "2", for example, to indicate "on call" or "off call" status, respectively. Once the database 310 contains the phone numbers of service providers, descriptions of their services, their prices, and their real-time availability statuses, the audio portal system 100 can provide services to users 102 desiring corresponding services.

In this embodiment a telephone is used as part of the delivery mechanism or audio transmission medium 250 of the audio portal system 100. A user 102 seeking services (service seekers) dials a central telephone number and then listens to a series of options. In one embodiment, the service seeker is initially prompted for verification information including, for example, a personal information number (PIN) code. Once verified, the service seeker is presented the option to browse available fields of service or enter the extension or identification (ID) code of a desired service provider for automatic connection when the provider is available.

Alternatively, the seeker indicates which type of service he would like to receive by speaking the name of a profession, such as "psychiatrist," which is processed by the system's audio interface 308 using audio interface procedures 322. Otherwise, the user 102 can listen to a series of professions and press the numerical keypad to select one. This process continues until the desired field of service is selected. In addition, when known, the seeker 102 can provide a service provider ID of a desired service provider for immediate connection with the selected service provider (as described above).

Once the user 102 has indicated a field of service using the service provider selection procedures 324, the audio portal system 100 searches its database 310 for service providers in that field using the DB access procedures 326. The user 102 can then further narrow down the selection of service providers by speaking keywords, such as "psychiatry- depression." The user 102 can also indicate a known specific service provider by speaking the service provider's name or punching in the service provider's code number or service provider ID into a telephone keypad for immediate connection.

The service provider selection procedures 324 in conjunction with the user interface procedures 338 allow the user 102 to further narrow the search for a service provider 200 by speaking--or pressing into the telephone keypad- a price, such as "50 cents per minute." The audio portal server computer 300 will then narrow the search in the database 310 for service providers 200 that match the price range. The service seeker 102 can further narrow the search for a service provider 200 by speaking-or pressing into the telephone keypad-a quality rating, such as "three stars or higher." The server computer 300 will then narrow the search in the database 340 for service providers 200 which match the quality rating range. Finally, the user 102 can further narrow the search for a service provider by speaking-or pressing into the telephone keypad- the name of a language, such as "Spanish." The server computer 300 will then narrow the search in the database 310 for service providers 200 who can speak this language.

In addition, the service provider selection procedures 324, in conjunction with the user interface procedures 338, allow the service seeker 102 to select a service provider 200 in response to listings of both the service provider, categories or fields of service available from the system, as well as a specific service provider once a field of service is selected via keypad entry of the user's audio transmission medium 104. Accordingly, the service provider selection procedures 324 and user interface procedures 338 will receive, in one embodiment, dual tone multi-frequency (DTMF) signals generated via the audio transmission medium keypad entry. As such, the user interface procedures 338 will decode the received user selection and convert the decoded DTMF signals into a database query format.

Once converted, the service provider selection procedures 324 will query the service provider database 310 using the user selection in order to provide either service providers within a field of service selected by the user or corresponding service provider selected by the user. Accordingly, in certain embodiments, prior users may enter a service provider code number for immediate connection to the service provider. Accordingly, the seeker can avoid delays provided via interface prompts required by new users in order to familiarize users with the fields of service available from the audio portal system 100. In one embodiment, if the service provider is not available, the seeker is given the option to connect with the highest rated service provider within the corresponding category. As such, the service provider selection procedures 324 and user interface procedures 338 include both IVR software, as well as DTMF decoding software, depending on whether the user's responses are provided as voice responses or keypad entry.

Once a service provider 200 with the desired characteristics has been chosen, the audio portal system 100 will automatically connect the service seeker 102 with the selected service provider 200. Since the service provider 200 has informed the audio portal system 100 that he/she is "on call" and ready to receive calls, the audio portal system 200 can reach him/her with a simple phone call via the audio interface 308. Once both the service seeker 102 and provider 200 are on the phone line 110, the audio portal system 100 conferences the two phone calls together, enabling services to be rendered in a live conversation. The system keeps track of the time spent on the phone call using the conversation monitoring procedures 340. The service seeker 102 is then billed accordingly, and the funds are transferred to the provider 200 using the billing procedures 328.

Figure 5:
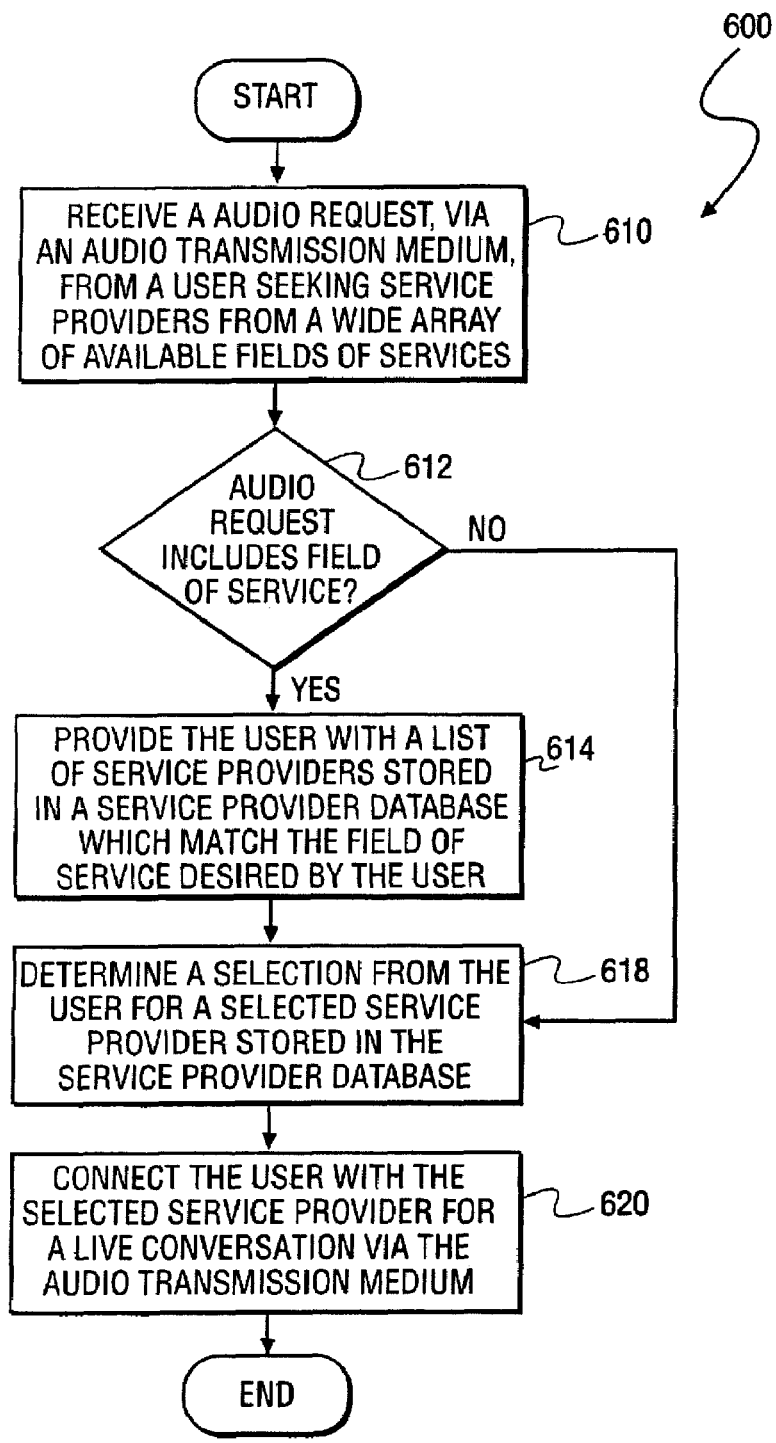
FIG. 5 is a flow chart illustrating a method used to allow a user to select a service provider for a live conversation using the audio portal system in accordance with a further embodiment of the present invention.

At the end of the phone call, the system prompts the service seeker 102 to rate the quality of the received service using the quality rating procedures 338. A quality rating of one to five stars, for instance, can be spoken into the telephone 104 or pressed into the telephone keypad. The audio portal system 100 records this rating, and in turn, can store the quality rating in the database 310 and use it as a quality-selection criterion the next time a user 102 calls. Procedural method steps for implementing the teachings of the present invention are now described. Operation Referring now to FIG. 5, a method 600 is depicted for allowing a user 102 to provide an audio request 106 to an audio portal service provider system 100 resulting in a live conversation between a user 102 and a selected service provider 200, for example, in the audio portal system 100 as depicted in FIGS. 1 and 2. At step 610, an audio request 106 is received by the audio portal service provider system 100 from a user 102 (service seeker) that is seeking service providers 200 from a wide array of fields of service available from the audio portal system 100. The audio request 106 is provided via an audio transmission medium 104 and received via an audio interface 308 of an audio portal server computer 300.

Once the request 106 is received, at step 612, it is determined whether the audio request 106 includes a field of service desired by the user 102. At step 614, when the audio request includes a field of service desired by the user 102, the user 102 is provided with a list of one or more service providers 200 stored in a service provider database 310, which match the field of service desired by the user 102. The audio portal server computer 300 selects the list of service providers for the user 102 using the service provider selection procedures 324, as well as the database access procedures 326. The list of service providers is then presented to the user 102 using the user interface procedures 338.

Next, at step 618, the audio portal server computer 300 determines a selection from the service seeker 102 for a selected service provider 200 stored within the service provider database 310. Finally, at step 620, the audio portal server computer 300 uses the audio interface 308 to connect the user 102 with the selected service provider 200 for a live conversation via the audio transmission mediums 104 and 250. The audio interface procedures 322 handle receipt of the audio request 106 and connection of the user 102 with the selected service provider 200. However, the audio interface procedures 322 may be performed by a human operator.

As described above, embodiments of the invention include user response via an audio request, which may include the service provider name, a field of service, or a service provider code for direct connection with the selected service provider. In addition, the user response may be via keypad entry through the user audio transmission medium 104, which generates a DTMF signal, which may also indicate a field of service desired by the user, a corresponding service provider desired by the user, as well as a service provider code for direct connection with the service provider.

As such, depending on the means for user response, the service provider selection procedures 324, in conjunction with the user interface procedures 338, will utilize either IVR software or DTMF decoding software in order to convert the user's response into a query which is recognized by the service provider database. Once the query is generated, the service provider selection procedures will query the service provider database 310 in order to return either the selected field of service, a selected service provider or when service provider code (e.g., extension) is determined to directly connect the service provider with the user when the service provider is available.

Figure 6:
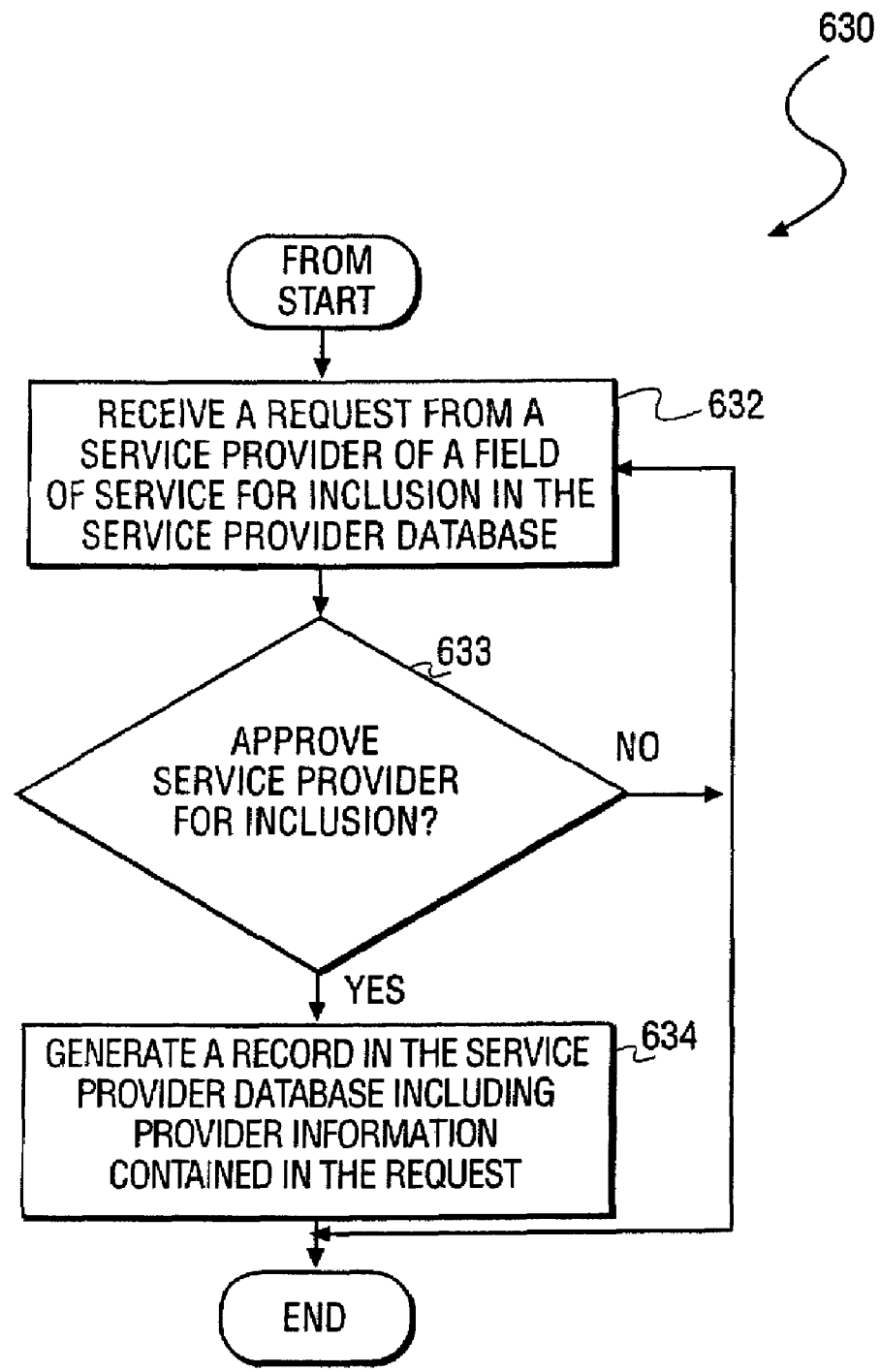
FIG. 6 is a flow chart illustrating an additional method used by a service provider desiring inclusion in the service provider database in accordance with a further embodiment of the present invention.

FIG. 6 depicts additional method steps 630 for adding service providers 200 to the audio portal system 100. At step 632, the audio portal server computer 300 receives a request from a service provider 200 of a field of service requesting inclusion in the service provider database 310. At step 633, the audio portal service provider system 100 determines whether to approve the service provider 200. Approval of a service provider 200 includes, for example, adding an additional field of service to the audio portal system 100 for a new service provider 200.

At step 634, when the service provider 200 is approved, the server computer 300 generates a record in the service provider database 310, including provider information contained in the audio request 106. Acceptance of the provider 200 and generation of provider records in the service provider database 310 is performed by the server computer 300 using provider inclusion procedures 330. The provider information stored in the database 310 can include a service price, real-time service provider availability, specific expertise of the service provider, languages spoken by the provider and a quality rating for the service provider.

Figure 7:
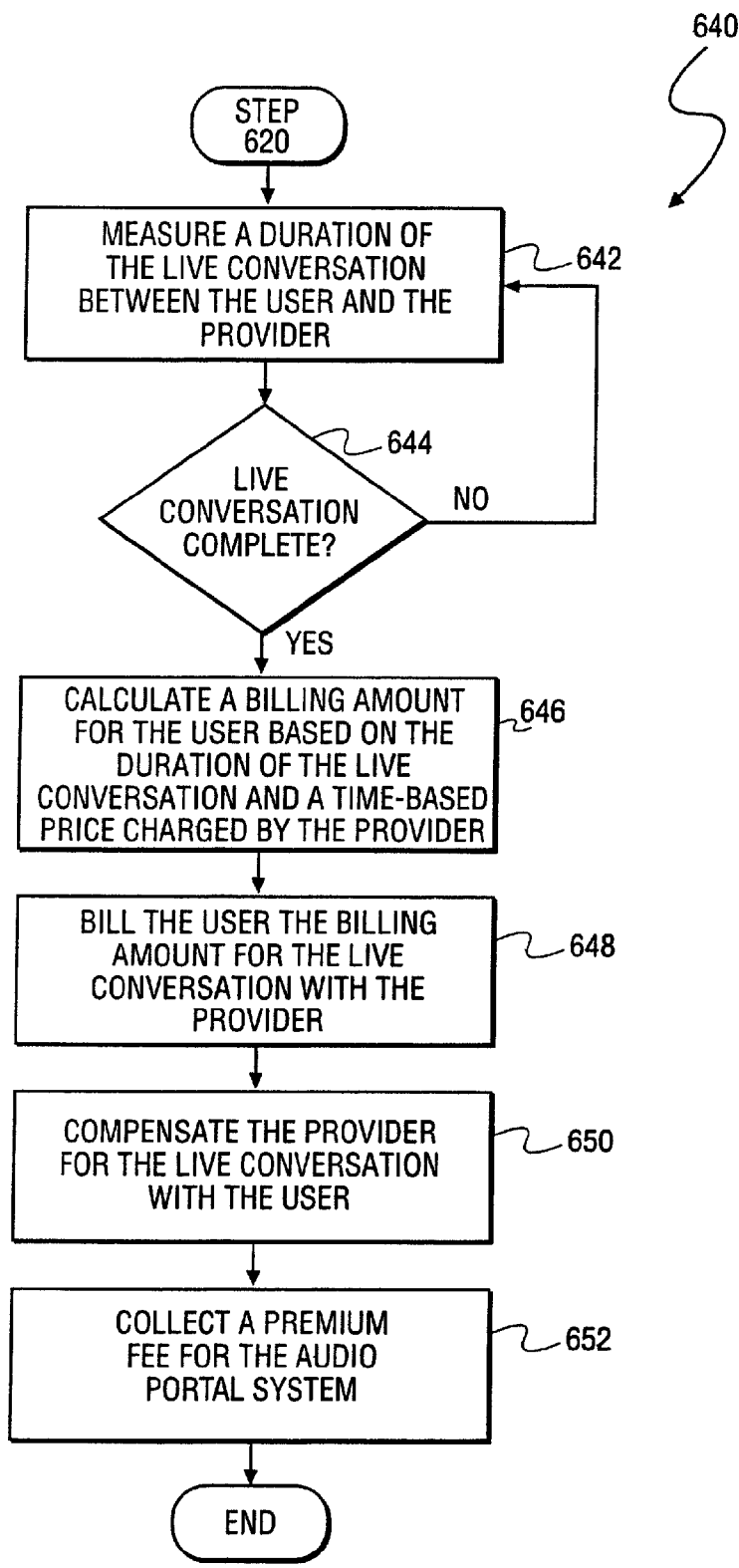
FIG. 7 is a flow chart illustrating an additional method for billing a user and compensating a service provider following a live conversation in accordance with a further embodiment of the present invention.

FIG. 7 depicts additional method step 640 for billing a user 102 and compensating a service provider 200 for a live conversation between the provider 200 and the user 102. At step 642, the server computer 300 measures a duration of the live conversation between the user 102 and the provider 200 using the conversation monitoring procedures 340. Once the live conversation is complete, the server computer 300 calculates a billing amount for the user 102 based on the duration of the live conversation and a time-based price charged by the service provider 200.

In one embodiment, the billing amount is generated by the server computer 300 using the billing procedures 328. However, the billing amount may be a flat fee. Otherwise, the server computer 300 continues measuring the duration of the live conversation between the user 102 and service provider 200 at step 642. The time-based price charged by the service provider 200 includes, for example, a per minute price, hourly price or a flat fee.

At step 648, the server computer 300 bills the service seeker 102 the billing amount for the live conversation with the provider 200. Generally, service seekers 102 of the audio portal service provider system 100 will have a billing account set up with the system 100. The audio portal system 100 can then either deduct from the user's account or charge the billing amount, for example, to a credit card submitted by the service seeker 102. At step 650, the audio portal service provider system 100 compensates the provider 200 for the live conversation with the service seeker 102. Finally, at step 652, the server computer 300 collects a premium fee for the audio portal system 100 as a predetermined percentage of the billing amount, for example, ten percent.

Figure 8:
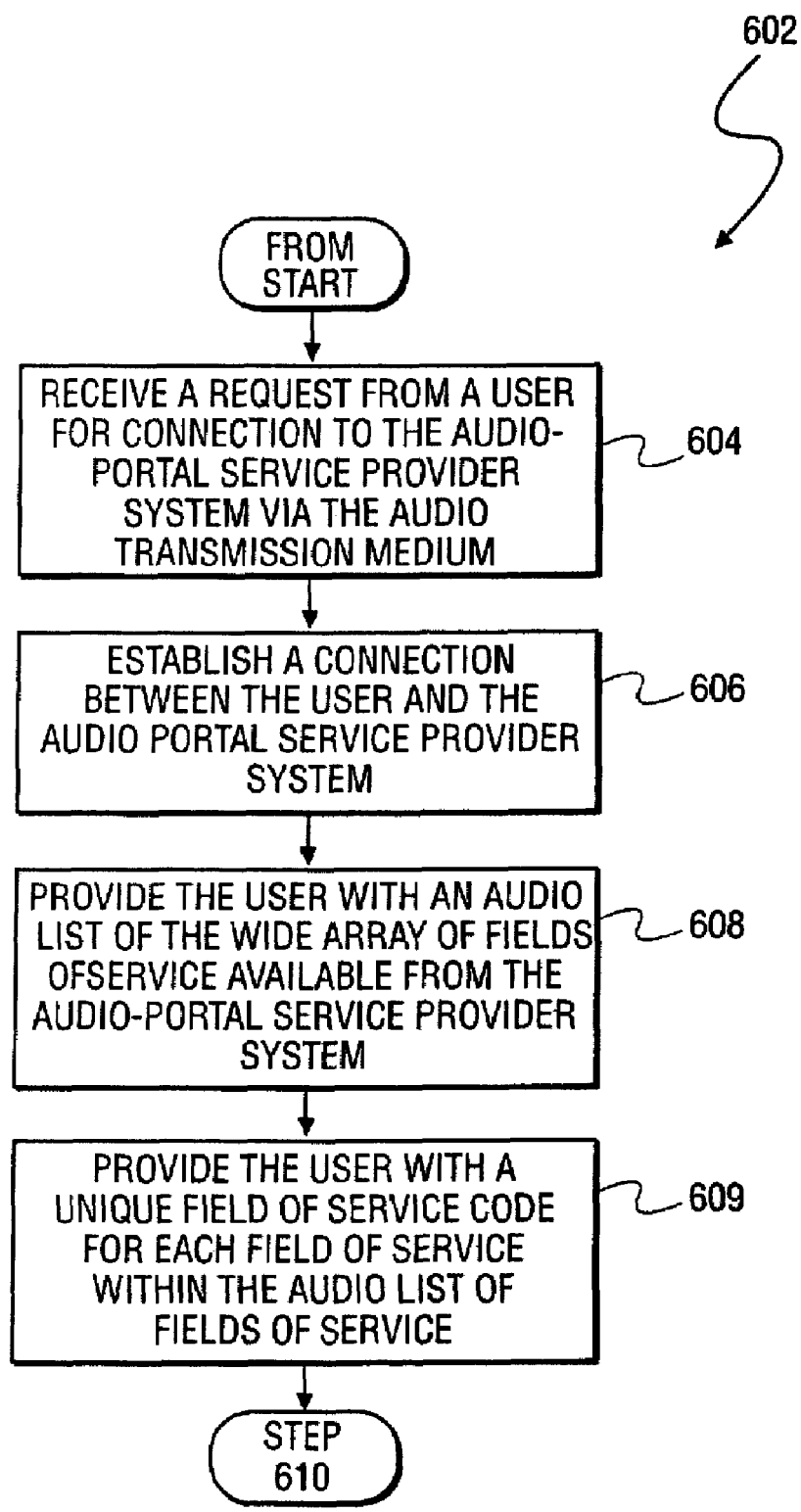
FIG. 8 is a flow chart illustrating an additional method for connecting a user desiring a service provider to the audio portal service provider system in accordance with an exemplary embodiment of the present invention.

FIG. 8 depicts additional method step 602 for connecting a service seeker 102 to the audio portal service provider system 100. At step 604, the server computer 300 receives a request from a user 102 for connection to the audio portal service provider system 100 via the audio transmission medium 104. The audio transmission medium 104 is, for example, a telephone. At step 606, the server computer 300 establishes a connection between the service seeker 102 and the audio portal system 100 via the audio interface 308. At step 608, the server computer 300 provides the user 102 with an audio list of the wide array of fields of service available from the audio portal service provider system 100 using the user interface procedures 338.

Finally, at step 609, the system 100 will provide the service seeker, via the user interface procedures 338, a unique field of service code for each field of service within the audio list of fields of service provided to the service seeker 102. Accordingly, the service seeker can select a desired field of service and enter a field of service code corresponding to the desired field of service within the keys of the service seeker's audio transmission medium 104. Once entered, the audio transmission medium 104 will generate a DTMF response, which is interpreted by the user interface procedures 338 in order to select service providers within the field of service desired by the user.

Figure 9:
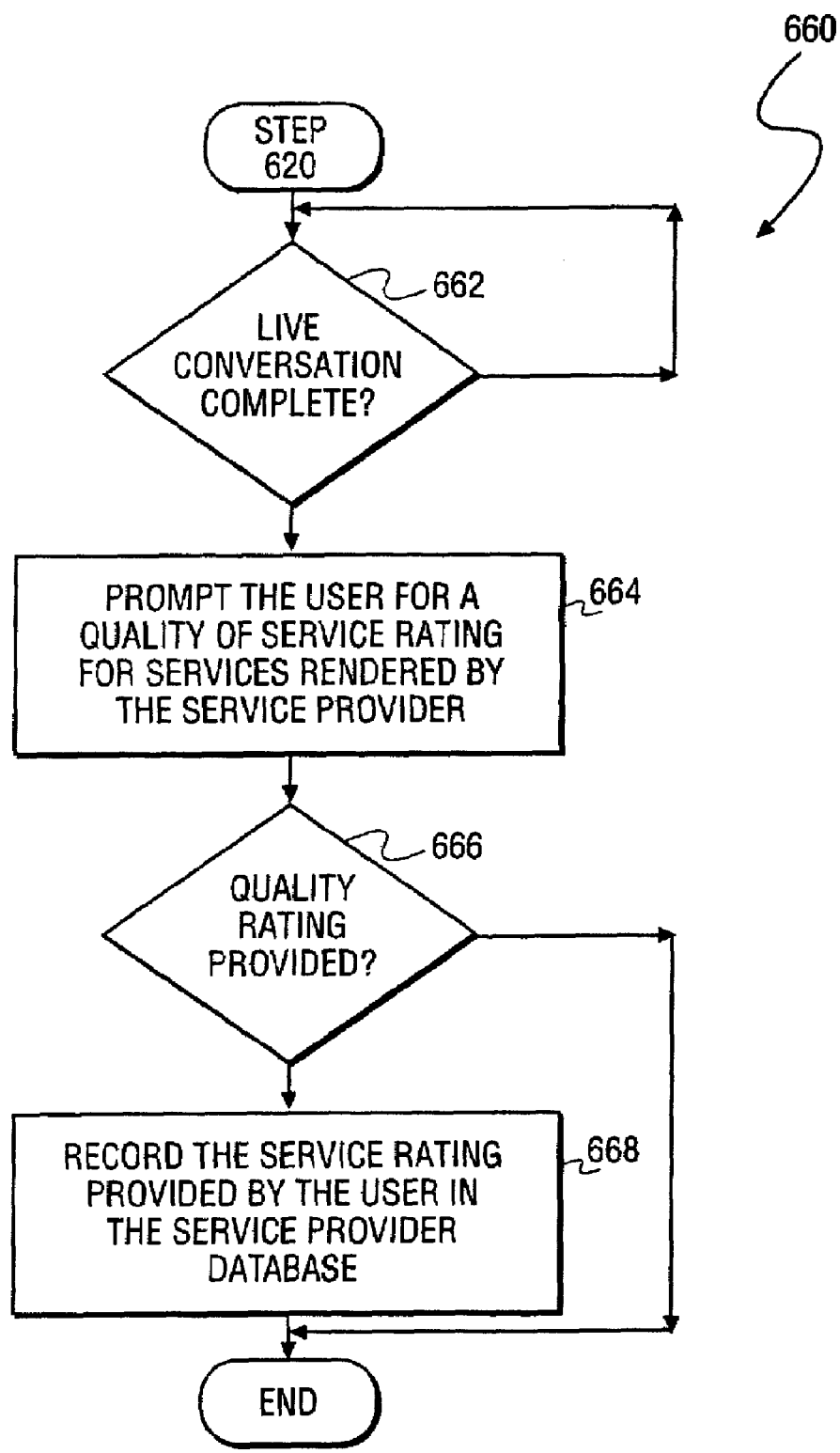
FIG. 9 depicts a flowchart illustrating an additional method for receiving a quality rating from a user regarding services provided by a service provider in accordance with an exemplary embodiment of the present invention.

FIG. 9 depicts additional method step 660 for receiving a quality rating from a user 102 regarding the live conversation with the service provider 200. At step 662, it is determined whether the live conversation is complete. At step 664, the server computer 300 prompts the user 102 for a quality of service rating for services rendered by the service provider 200. At step 666, it is determined whether a quality rating is provided by the user 102. At step 668, the server computer 300 records the service rating provided by the user 102 in the service provider database 310.

As described above, the audio request 106 provided by the user 102 can include the category of service providers, a maximum price range for service providers, desired times of availability for service providers, specific expertise of the service provider, a language spoken by the service provider and a minimum quality rating for the service provider. These criteria are used by the server computer 300 and provided to service provider selection procedures 324 in order to narrow the list of service providers 200 for the user 102 to choose from.

APPLICATION OF THE INVENTION

Danielle, a graduate student in economics, happens to be an expert user of Microsoft Excel. To earn extra money while writing her thesis, Danielle decides to post her Excel-help service son the subject web site, an Internet based implementation of the invention. She registers at the site and lists herself under "Computer Help" and "Excel" at the rate of $1.00 per minute. During the registration process, Danielle provides her telephone number and a description of her abilities, which include regression models and statistical analysis. Whenever Danielle is at home alone studying for long stretches in the evening, she signs on to the subject web site and changes her state of availability to "On Call," or immediately available to receive clients.

Michael is a management consultant building a regression model on Excel for a large clothing retailer. At midnight in the office, he is having trouble analyzing his spreadsheet. Looking to receive help, he dials the 1-800 number of the subject system. He is prompted by the system to indicate the area of service he desires. He speaks the words, "Computer Help," which are recognized by the system's voice-recognition software. The system has several thousand computer-help service providers to choose from, so Michael specifies his needs by speaking the words, "regression models and analysis."

The system has about 50 service providers who are "On Call" to receive customers regarding regression models and analysis. Michael then indicates the price and quality he desires by speaking the words, "one dollar per minute or less" and "with a three-star quality rating or above." The system uses these parameters to fine only those service providers who fit within this price and quality range and can presently receive customers regarding regression models and analysis—there are four. The system relays the descriptions of the four service providers to Michael. He selects Danielle by speaking the words, "Connect Me."

Since Michael has not used the subject phone system before, he first must enter his credit card number to pay for the call. Once the credit card number has been confirmed, the system dials Danielle's phone number, which it has on file from her registration at the web site. When Danielle picks up the phone, the automated voice of the system informs her that there is a client on the line looking for "Computer Help" and willing to pay her $1.00 price per minute. The system asks her whether she would like to accept the call. She speaks the word "yes" (or presses "1" on her telephone keypad), and the system conferences the separate phone calls to Danielle and Michael together so that they can communicate.

Michael and Daniel talk until his problem is solved, which takes eight minutes. Michael's credit card is billed for eight dollars. He receives a confirming message via electronic mail notifying him of this, along with a request to evaluate Danielle's service, which he does, pressing "5" on his telephone keypad to award her five stars, which the system then averages into her overall quality rating. Danielle's web site account is credited for eight dollars minus a fee collected by the web site. Once Danielle's web site account has accumulated a surplus of $25, she receives a check from the web site in the mail. After receiving many positive reviews from online clients such as Michael, Danielle is inundated with Excel-help requests whenever she goes "On Call," enabling her to raise her rates to $1.50 per minute.

The scenario described above illustrates a situation where Michael is allowed to enter a voice request for selection of a service provider and to further narrow the categories. However, certain implementations of the present invention will provide service seekers, such as Michael, with a listing of fields of service provided by the system and indicate a field of service code corresponding to each field of service available from the system. As such, a user such as Michael, would select the desired field of service and enter a field of service code corresponding to the desired field of service via the keypad of Michael's telephone in order to provide a list of service providers in the area of computer health. Therefore, service seekers such as Michael are provided the option to enter voice responses or keypad entry responses in order to enable final selection of a service provider and enter into a live conversation with the desired service provider in order to solve the service seeker's problem.

Alternate Embodiments

Several aspects of one implementation of the audio portal system for providing a real-time communications connection between a service seeker and a service provider have been described. However, various implementations of the audio portal system provide numerous features including, complementing, supplementing, and/or replacing the features described above. Features can be implemented as part of the audio portal system or as part of an on-line implementation in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to an audio portal, it will be appreciated by those skilled in the art that the teaching of the present invention can be applied to other systems. In fact, systems for connection of service seekers and service providers for real-time communication are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

Advantages of the invention include providing users with the capability to engage in a live conversation with a selected service provider via a telephone. Contrary to prior systems requiring an internet connection and browser to receive such services, the equivalent is now provided by a simple audio transmission medium such as the telephone. As a result, virtually anyone can benefit from the capabilities provided by the present invention. The system also allows providers of a field of service to be compensated for supplying their expertise to a user.

Having disclosed exemplary embodiments, modifications and variations may be made to the disclosed embodiments while remaining within the scope of the invention as defined by the following claims.

The invention claimed is:

1. A method, comprising:
    a first party providing an advertisement to a customer on behalf of an advertiser; and
    after a telephonic connection being established between the advertiser and the customer, via the advertisement, the first party charging the advertiser a fee based on a price specified by the advertiser, the fee being independent of a duration of the telephonic connection;
    wherein the price is for a service rendered by the advertiser over the telephonic connection between the advertiser and the customer.

2. The method of claim 1, wherein the advertiser is a service provider.

3. The method of claim 2, wherein the first party providing the advertisement includes providing a reference to be selected by a customer to initiate a telephone call to the service provider.

4. The method of claim 1, wherein the first party providing the advertisement includes the first party providing the advertisement in response to a keyword search submitted by a customer.

5. The method of claim 4, wherein the keyword search is submitted in one of: audio and voice.

6. The method of claim 5, wherein the keyword search includes a voice input; and the method further comprises recognizing the voice input via software.

7. The method of claim 5, wherein the keyword search includes a keypad input transmitted as a dual tone multi-frequency (DTMF) signal.

8. The method of claim 4, further comprising:
    determining whether to use integrated voice recognition or dual tone multi-frequency (DTMF) decoding to process the keyword search submitted by the customer.

9. The method of claim 4, wherein the keyword search is submitted through a telephone.

10. The method of claim 9, wherein the advertisement is provided through the telephone.

11. The method of claim 1, wherein the advertisement comprises a description provided by the advertiser.

12. The method of claim 11, further comprising:
    the first party receiving the description from the advertiser via Internet.

13. The method of claim 1, further comprising:
    deducting from an account of the customer set up with the first party according to the price specified by the advertiser.

14. The method of claim 13, further comprising:
    crediting an account of the advertiser set up with the first party according to the price specified by the advertiser.

15. The method of claim 1, wherein the advertisement is placed on a media channel.

16. The method of claim 15, wherein the media channel includes a telephonic connection between the first party and the customer which supports voice communication.

17. The method of claim 15, farther including the first party providing advertisements on the media channel on behalf of multiple service providers, the advertisements to include at least a reference to a telephonic connection with a respective one of the service providers;
    the first party charging a fee after a telephonic connection being established between the respective one of the service providers and a customer.

18. The method of claim 17, farther comprising:
    receiving a selection by the customer over the media channel after the first party providing the advertisements on the media channel on behalf of the multiple service providers.

19. A system comprising:
    means for a first party providing an advertisement on behalf of an advertiser; and
    means for the first party charging the advertiser a fee based on a price specified by the advertiser, after a telephonic connection being established between the advertiser and a customer, via the advertisement, the fee being independent of a duration of the telephonic connection, wherein the price is for a service rendered by the advertiser over the telephonic connection between the advertiser and the customer.

20. A machine-readable medium having stored thereon a set of instructions, which when executed, cause a data processing system to perform a method comprising:
    a first party providing an advertisement to a customer on behalf of an advertiser; and after a telephonic connection being established between the advertiser and the customer, via the advertisement, the first party charging the advertiser a fee based on a price specified by the advertiser, the fee being independent of a duration of the telephonic connection;

wherein the price is for a service rendered by the advertiser over the telephonic connection between the advertiser and the customer.

21. A method, comprising:

a first party providing an advertisement, on behalf of an advertiser, to a customer via a telephonic apparatus of the customer; and after a telephonic connection being established between the advertiser and the telephonic apparatus of the customer, via the advertisement, the first party charging the advertiser a fee based on a price specified by the advertiser;

wherein the price is associated with a service rendered by the advertiser over the telephonic connection between the advertiser and the customer.

22. The method of claim 21, wherein the advertisement comprises a description provided by the advertiser to the first party.

23. The method of claim 21, further comprising:

establishing a telephonic connection between the first party and the customer to receive a search request from the customer;

wherein the advertisement is in response to the search request.

24. The method of claim 23, further comprising:

the first party establishing a telephonic connection between the first party and the advertiser in response to a selection from the customer; and the first party conferencing the telephonic connection between the first party and the customer and the telephonic connection between the first party and the advertiser to connect the advertiser and the customer.

25. The method of claim 23, wherein the advertisement is provided over the telephonic connection between the first party and the customer.

26. A method, comprising:

a first party providing an advertisement, on behalf of an advertiser, to a customer in response to a voice-based search request received from a telephone of the customer; and after a telephonic connection being established between the advertiser and the telephone of the customer, via the advertisement, the first party charging the advertiser a fee based on a price specified by the advertiser, the fee being independent of a duration of the telephonic connection, wherein the price is for a service rendered by the advertiser over the telephonic connection between the advertiser and the customer.

27. The method of claim 26, further comprising:

processing the voice-based search request via speech recognition.

28. The method of claim 27, wherein the advertisement is provided in voice generated via text-to speech.

29. The method of claim 26, wherein the voice-based search request includes a category of service providers.

30. A machine-readable medium having stored thereon a set of instructions, which when executed, cause a data processing system to perform a method comprising:

providing an advertisement, on behalf of an advertiser, from a first party to a customer via a telephonic apparatus of the customer; and after a telephonic connection being established between the advertiser and the telephonic apparatus of the customer, via the advertisement, charging the advertiser a fee by the first party based on a price specified by the advertiser;

wherein the price is associated with a service rendered by the advertiser over the telephonic connection between the advertiser and the customer.

31. The machine-readable medium of claim 30, wherein the advertisement comprises a description provided by the advertiser to the first party.

32. The machine-readable medium of claim 30, wherein the method further comprises:

establishing a telephonic connection between the first party and the customer to receive a search request from the customer;

the first party establishing a telephonic connection between the first party and the advertiser in response to a selection from the customer; and the first party conferencing the telephonic connection between the first party and the customer and the telephonic connection between the first party and the advertiser to connect the advertiser and the customer;

wherein the advertisement is in response to the search request.

33. A data processing system, comprising:

means for providing an advertisement, on behalf of an advertiser, from a first party to a customer via a telephonic apparatus of the customer; and means for charging the advertiser a fee by the first party based on a price specified by the advertiser, after a telephonic connection being established between the advertiser and the telephonic apparatus of the customer, via the advertisement, wherein the price is associated with a service rendered by the advertiser over the telephonic connection between the advertiser and the customer.

34. The data processing system of claim 33, further comprising:

means for establishing a telephonic connection between the first party and the customer to receive a search request from the customer, wherein the advertisement is provided over the telephonic connection between the first party and the customer in response to the search request.

35. A machine-readable medium having stored thereon a set of instructions, which when executed, cause a data processing system to perform a method comprising:

providing an advertisement, on behalf of an advertiser, from a first party to a customer in response to a voice-based search request received from a telephone of the customer; and after a telephonic connection being established between the advertiser and the telephone of the customer, via the advertisement, charging the advertiser a fee by the first party based on a price specified by the advertiser, the fee being independent of a duration of the telephonic connection, wherein the price is for a service rendered by the advertiser over the telephonic connection between the advertiser and the customer.

36. The machine-readable medium of claim 35, wherein the method further comprises:

processing the voice-based search request via speech recognition;

wherein the advertisement is provided in voice generated via text-to speech.

37. A data processing system, comprising:
means for providing an advertisement, on behalf of an advertiser, from a first party to a customer in response to a voice-based search request received from a telephone of the customer; and
means for charging the advertiser a fee by the first party based on a price specified by the advertiser, after a telephonic connection being established between the advertiser and the telephone of the customer, via the advertisement, wherein the fee is independent of a duration of the telephonic connection and the price is for a service rendered by the advertiser over the telephonic connection between the advertiser and the customer.

38. The data processing system of claim 37, further comprising:
means for processing the voice-based search request via speech recognition, wherein the voice-based search request includes a category of service providers.

* * * * *